US012654215B2

(12) United States Patent
Heep et al.

(10) Patent No.: US 12,654,215 B2
(45) Date of Patent: Jun. 16, 2026

(54) PORTABLE ELECTRIC POWER TOOL FOR BENDING ELONGATE OBJECTS

(71) Applicant: BLACK & DECKER INC., New Britain, CT (US)

(72) Inventors: Tobias Heep, Steinbach (DE); Fridtjof Krische, Mainz (DE); Rafael Gottschling, Selters (DE); Lukas Walther, Hünstetten (DE); Klaus Kirschenmann, Wiesbaden (DE); Felix Kraft, Idstein (DE); Yasar Akbaba, Neu-Isenburg (DE); Lukas Diehl, Niedernhausen (DE)

(73) Assignee: BLACK & DECKER INC.

( * ) Notice: Subject to any disclaimer, the term of this patent is extended or adjusted under 35 U.S.C. 154(b) by 0 days.

(21) Appl. No.: 18/613,823

(22) Filed: Mar. 22, 2024

(65) Prior Publication Data

US 2024/0367212 A1 Nov. 7, 2024

(30) Foreign Application Priority Data

May 5, 2023 (GB) ...................................... 2306685
Jun. 9, 2023 (GB) ...................................... 2308631

(51) Int. Cl.
*B21D 7/06* (2006.01)
*B21D 7/08* (2006.01)
(Continued)

(52) U.S. Cl.
CPC ............... *B21D 7/06* (2013.01); *B21D 7/085* (2013.01); *B25F 5/001* (2013.01)

(58) Field of Classification Search
CPC .......... B21D 7/06; B21D 7/085; B21D 7/063; B25B 21/00
(Continued)

(56) References Cited

U.S. PATENT DOCUMENTS 7,058,291 B2 * 6/2006 Weaver .................. H02K 7/083 318/720
8,695,725 B2 * 4/2014 Lau .......................... B25F 5/02 173/171

(Continued)

FOREIGN PATENT DOCUMENTS

CN 101085458 A 12/2007
CN 217422078 U 9/2022

(Continued)

OTHER PUBLICATIONS

EP Extended Search Report dated Jun. 28, 2024, cited in corresponding EP Patent Application No. 24161415.5.

(Continued)

*Primary Examiner* — Shelley M Self
*Assistant Examiner* — Patrick B Fry
(74) *Attorney, Agent, or Firm* — Dickinson Wright PLLC

(57) ABSTRACT

Disclosed herein is a portable electric power tool for bending elongate objects. The tool includes an electric motor having a motor output shaft, a bend mechanism having a support portion and a bias portion. The bias portion is operatively coupled to the motor output shaft via a transmission of the tool which in use causes linear relative movement between the bias portion and the support portion. The relative movement causes force to be applied by the bend mechanism to an elongate object in use at different locations along the length of the elongate object for bending the elongate object. The transmission includes a conversion mechanism for converting torque into a linear force for causing the linear relative movement between the bias portion and the support portion.

19 Claims, 8 Drawing Sheets

(51) Int. Cl.
*B25B 21/00* (2006.01)
*B25F 5/00* (2006.01)

(58) Field of Classification Search
USPC .......................................................... 173/171
See application file for complete search history.

(56) References Cited

U.S. PATENT DOCUMENTS

| | | | | |
|---|---|---|---|---|
| 9,038,745 | B2 * | 5/2015 | Mattson | B25F 5/001 173/217 |
| 9,718,108 | B2 * | 8/2017 | Latoria | B21D 11/12 |
| 10,076,376 | B2 * | 9/2018 | Bootwala | A61B 17/8863 |
| 11,007,565 | B2 * | 5/2021 | Yabuguchi | B21J 15/045 |
| 2010/0000288 | A1 | 1/2010 | Barezzani et al. | |
| 2013/0081440 | A1 | 4/2013 | Latoria | |
| 2016/0074918 | A1 | 3/2016 | Latoria | |
| 2018/0009098 | A1 | 1/2018 | Nagasaka et al. | |
| 2021/0001466 | A1 | 1/2021 | Valentini | |
| 2022/0072695 | A1 * | 3/2022 | Rosani | B25B 27/10 |
| 2023/0031227 | A1 | 2/2023 | Brochman | |
| 2023/0241660 | A1 * | 8/2023 | Yahr | B25B 33/00 72/149 |
| 2024/0305055 | A1 * | 9/2024 | Miyazawa | B25B 27/146 |

FOREIGN PATENT DOCUMENTS

| | | | |
|---|---|---|---|
| CN | 115383011 | A | 11/2022 |
| JP | H11192513 | A | 7/1999 |
| WO | 2023150273 | A1 | 8/2023 |

OTHER PUBLICATIONS

GB Search Report Dated Dec. 4, 2023, cited in corresponding GB Patent Application No. GB2308631.7.

* cited by examiner

PORTABLE ELECTRIC POWER TOOL FOR BENDING ELONGATE OBJECTS

CROSS-REFERENCE TO RELATED APPLICATIONS

This application claims priority from GB Patent Application No. 2306685.5, filed May 5, 2023, and GB Patent Application No. 2308631.7, filed Jun. 9, 2023, the disclosures of which is incorporated herein by reference in its entirety.

FIELD OF THE INVENTION

This specification relates to portable electric power tools for bending elongate objects such as rebar or linear conduits such as pipes or tubes.

BACKGROUND OF THE INVENTION

Rebar is a term used for steel reinforcement bars around which concrete is poured during construction. The presence of rebar embedded within concrete improves the integrity of a concrete structure. Prior to concrete pouring rebar is arranged in a predetermined manner. Rebar is generally provided in the form of straight rods, to enable mass production, making it incumbent on construction workers to bend such rods into required shapes. Hydraulic rebar bending tools are known. The hydraulic nature of such tools makes them heavy and subject to high maintenance requirements. Also, in order for such hydraulic rebar bending tools to feel balanced in a user's hand, the manufacturer needs to carefully consider the arrangement of features within the tool housing relative to the handle. Due to space limitations within the tool housing there is some play off between arranging internal features of the tool so that the tool works vs. arranging such features so that weight distribution of the tool is optimised. Unfortunately, though due to the complex nature of hydraulic mechanisms there is not a lot of scope for rearranging internal features of the tool so that weight distribution is optimised.

BRIEF SUMMARY OF THE INVENTION

According to the invention there is provided a portable electric power tool for bending elongate objects according to claim 1, wherein optional features thereof are defined in claims 2 to 15.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
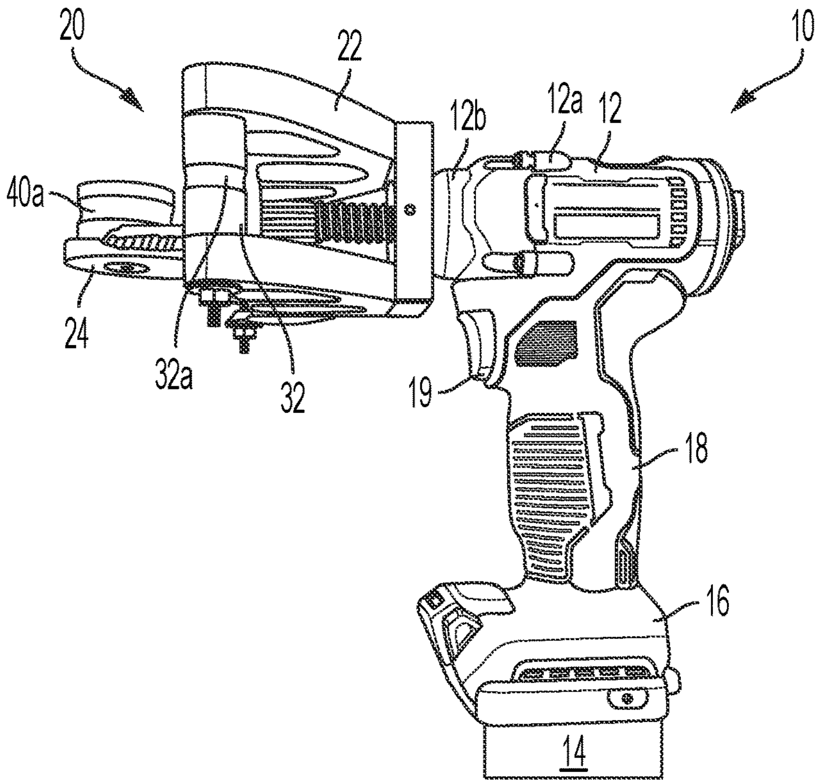
FIG. 1 is a side view of a portable electric power tool for bending rebar.

FIG. 1 shows a side cross-sectional view of a portable electric rebar bending power tool 10. The tool 10 has a housing 12 part of which is formed of a plastic clam shell type construction 12*a* having two halves which are fastened together. A battery 14 is releasably connected to the base 16 of the handle 18 via a battery attachment feature. The tool 10 has a bend mechanism 20 for bending rebar in use. A support portion 22 of the bend mechanism 20 is fixed relative to the tool housing 12, specifically to a metal part 12*b* of the housing 12. A bias portion 24 of the bend mechanism 20 is moveable relative to the tool housing 12.

Figure 2:
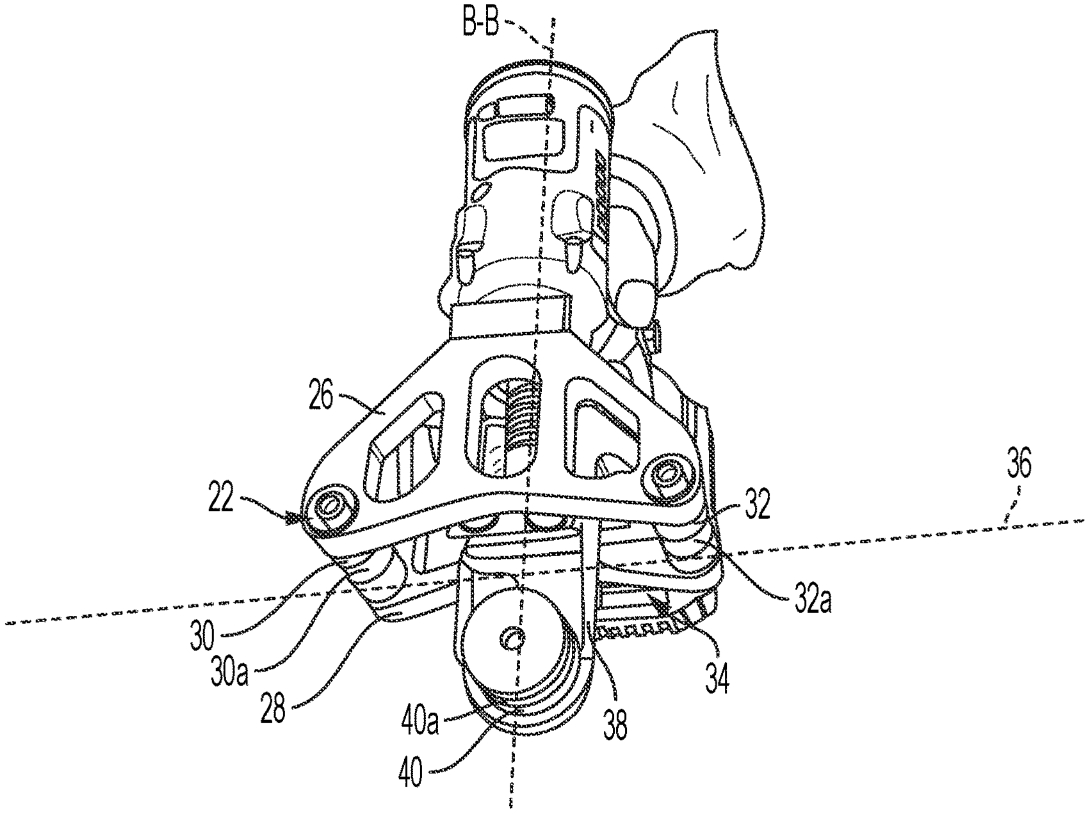
FIG. 2 is a perspective view of the portable electric power tool in FIG. 1.

FIG. 2 shows that the support portion 22 has an upper frame portion 26 and a lower frame portion 28. A first abutment portion 30 and a second abutment portion 32 each extend between the upper and lower frame portions 26, 28. Optionally the first abutment portion 30 and the second abutment portion 32 are arranged so as to be rotatable relative to the upper and lower frame portions 26, 28. The first and second abutment portions 30, 32 are separated by a gap 34 and a notional axis 36 extends between the first and second abutment portions 30, 32. The bias portion 24 has a finger 38 which supports a third abutment portion 40.

FIGS. 1 and 2 show that the first, second and third abutment portions 30, 32, 40 each have a circumferential depression 30*a*, 32*a*, 40*a*. The first, second and third abutment portions 30, 32, 40 are arranged so that the circumferential depressions 30*a*, 32*a*, 40*a* are in the same plane so that in use rebar is received in such depressions for enhancing stability of rebar during a bending operation.

As will be explained in detail, the bias portion 24 is operatively coupled to an electric motor of the rebar bending power tool 10 so that the third abutment portion 40 can be linearly moved relative to the first and second abutment portions 30, 32 along a direction (denoted B-B in FIG. 2) perpendicular to the notional axis 36 for causing the first to third abutment portions 30, 32, 40 to bend a piece of rebar.

Figure 3:
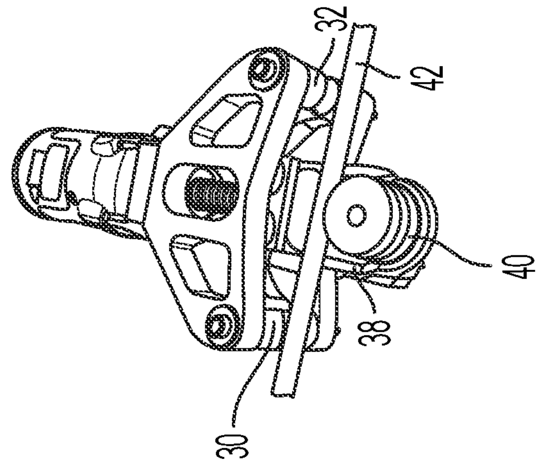
FIGS. 3, 4 and 5 show the portable electric power tool of FIGS. 1 and 2 at various stages during a bending operation.

FIG. 3 shows a piece of rebar 42 placed on the finger 38 so it lies in the same plane as the circumferential depressions 30*a*, 32*a*, 40*a* provided on the first to third abutment portions 30, 32, 40. The first and second abutment portions 30, 32 are located on a first side of the rebar 42 and the third abutment portion 40 is located on a second, opposite, side of the rebar 42.

Figure 4:
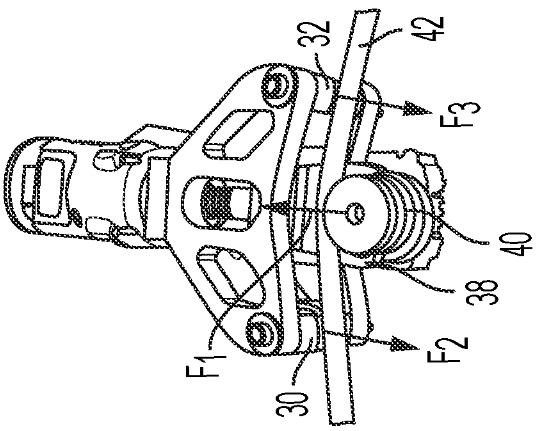

Upon pulling a trigger 19 of the tool 10 the bias portion 24 of the bend mechanism 20 is movably driven relative to the support portion 22 of the bend mechanism 20 as shown in FIG. 4. More specifically the third abutment portion 40 is forced axially along a direction (denoted B-B in FIG. 2) perpendicular to the notional axis 36, whereby the third abutment portion 40 is moved towards the gap 34 extending between the first and second abutment portions 30, 32.

During such movement the third abutment portion 40 exerts a force F1 on the rebar 42, the first abutment portion 30 exerts a force F2 on the rebar 42 and the second abutment portion 32 exerts a force F3 on the rebar 42; in the embodiment described the force F1 arises from pulling the bias portion 24 and thus retracting the finger 38 into the tool 10 whereas the forces F2 and F3 are reaction forces arising due to the rebar 42 being pressed against the first and second abutment portions 30, 32.

It will be appreciated that interaction of the rebar 42 with the first to third abutment portions 30, 32, 40 and the forces F1, F2, F3 exerted thereby on the rebar 42 cause the rebar 42 to bend. The further the third abutment portion 40 is moved relative to the first and second abutment portions 30, 32 the more the rebar 42 is bent.

Figure 5:
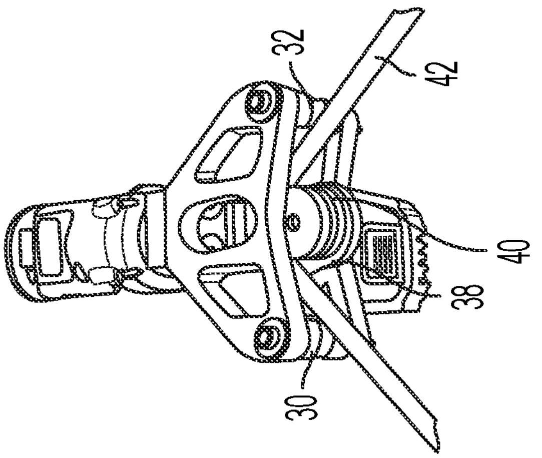

FIG. 5 shows that the third abutment portion 40 can be moved through the gap 34 between the first and second abutment portions 30, 32. The extent to which the rebar 42 is bent can thus be selectively controlled by a user of the portable rebar bending power tool 10. Naturally, moving the third abutment portion 40 in the reverse direction releases the rebar 42.

Internal features of the portable electric rebar bending power tool 10 will now be described with reference to FIG. 6 which shows a side cross-sectional view of such power tool.

The tool 10 has a controller 44 for determining that the trigger 19 has been pulled. In response to the controller 44 determining that the trigger 19 has been pulled the controller 44 generates a signal to activate an electric motor 46, which is a DC brushless motor. Persons skilled in the art will be able to select a suitable electric motor, however, an example of a suitable electric motor 46 is the BL41 DC brushless motor designed by Stanley Black & Decker Inc. and used in some commercially available DEWALT® branded power tools. The motor 46 is located in the handle 18 and has a motor output shaft 48.

Torque from the motor output shaft 48 is transferred via a transmission 50 to an input pinion 52 of a bevel gear arrangement 49. The transmission 50 comprises at least one planetary gear arrangement for reducing output speed while increasing torque. The motor output shaft 48 drives an input sun gear $\mathbf{50}_{S1}$ of the first stage of the transmission 50. The input sun gear $\mathbf{50}_{S1}$ meshes with a plurality of first stage planet gears $\mathbf{50}_{P1}$ which mesh with a stationary outer ring gear $\mathbf{50}_{R}$ and are coupled to a first stage carrier $\mathbf{50}_{C1}$. An axial extension of the first stage carrier $\mathbf{50}_{C1}$ is the input sun gear $\mathbf{50}_{S2}$ of the second stage of the transmission 50. The input sun gear $\mathbf{50}_{S2}$ meshes with a plurality of second stage planet gears $\mathbf{50}_{P2}$ which mesh with the stationary outer ring gear $\mathbf{50}_{R}$ and are coupled to a second stage carrier $\mathbf{50}_{C2}$. An axial extension of the second stage carrier $\mathbf{50}_{C2}$ is rotationally fixed to the input pinion 52 of the bevel gear arrangement.

The input pinion 52 of the bevel gear arrangement 49 thus rotates at a lower speed than the motor output shaft 48 however with an increased torque relative to the motor output shaft 48.

The motor output shaft 48, transmission 50 and input pinion 52 of the bevel gear arrangement 49 are aligned along a first axis A-A which extends along a longitudinal length of the handle 18. By also locating the battery attachment feature (and thus battery 14) on the first longitudinal axis A-A weight distribution of the tool 10 is improved, whereby the tool 10 feels balanced in a user's hand.

By locating the motor 46, the transmission 50 and the battery 14 on the same axis A-A extending along the length of the handle 18 improves weight distribution of internal features of the tool 10. Also, by providing the motor 40 within the handle 18 leaves more space available within the tool housing 12 above the handle 18, whereby there is more freedom to position features of the tool 10 in positions which improve weight distribution of internal features of the tool 10.

It will be appreciated that there is some design freedom in the transmission 50 between the motor output shaft 48 and the input pinion 52 of the bevel gear arrangement 49. In particular the number of planetary gear stages, and its (or their) configuration, forming the transmission 50 depends on the required gear ratio to be achieved between the motor output shaft 48 and the input pinion 52.

Given that it is well known that planetary gear stages step down rotation speed while stepping up torque persons skilled in the art, based on the disclosure given herein, will be able to decide upon a suitable transmission arrangement which achieves the required gear ratio for their tool to function; wherein the appropriate gear ratio depends on multiple factors including maximum achievable motor output torque, pitch of the ball screw arrangement described below, friction between moveable features within the tool 10 and the maximum permissible bending force (such as up to 100 kN). It will be appreciated that for some tools 10 a suitable transmission 50 may only have a single planetary gear stage, whereas for other tools a suitable transmission 50 may have a plurality of planetary gear stages arranged in series.

Figure 6:
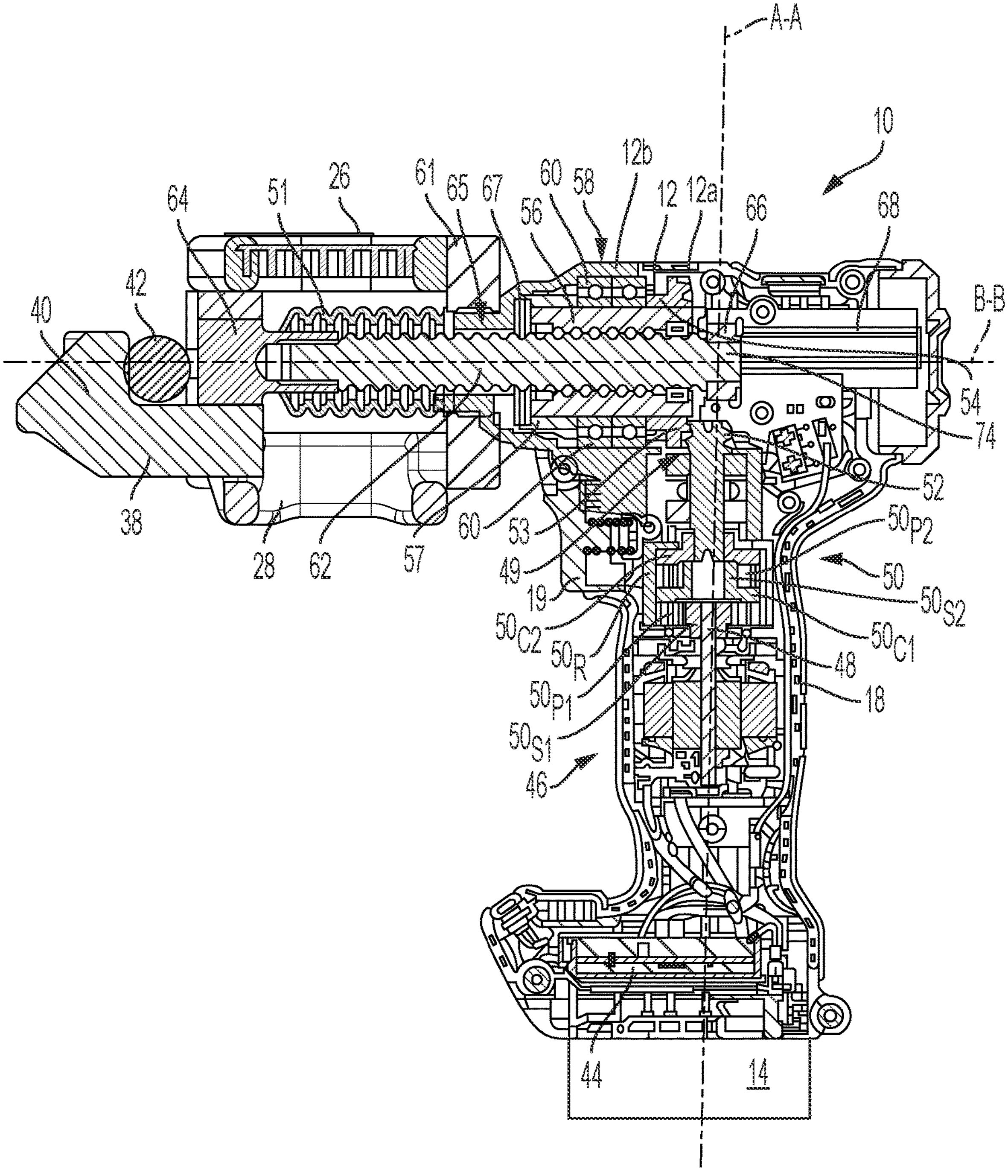
FIG. 6 is a cross-sectional view of the portable electric power tool in FIGS. 1 to 5.

Continuing with reference to FIG. 6 a bevel gear 53 of the bevel gear arrangement 49, which is meshed with the input pinion 52 for receiving torque therefrom, is provided. An axial extension of the bevel gear 53, hereafter the driving sleeve 54, is rotationally fixed relative to an input sleeve 56 of a ball screw arrangement 58. The driving sleeve 54 and input sleeve 56 are fixed relative to each other due to a friction fit arrangement. An internal surface of the input sleeve 56 comprises a threaded surface. The outer surface of the input sleeve 56 is supported by bearings 60 which enable rotation of the input sleeve 56 with respect to the housing 12. In a radial direction the bearings 60 are located between the input sleeve 56 and the inner surface of the housing 12, whereas in an axial direction the bearings 60 are located between the driving sleeve 54 and a bearing engagement sleeve 57 which is rotatably fixed to the input sleeve 56 via a friction fit engagement; part of the bearing engagement sleeve 57 lips around the outer edge of an axial bearing 67 for preventing the axial bearing 67 from touching the inner side of the housing 12. A threaded rod 62 is mounted within the input sleeve 56, which extends through the input sleeve 56. A plurality of balls, such as metal ball bearings, ride in the opposing threaded surfaces of the input sleeve 56 and threaded rod 62, thereby defining a ball screw arrangement 58.

When the input sleeve 56 is rotatably driven by the driving sleeve 54 this causes axial movement of the threaded rod 62. In other words, torque from the electric motor 46 is transferred through the transmission 50, through the bevel gear arrangement 49 to the input sleeve 56, whereby rotation thereof causes axial movement of the threaded rod 62. The threaded rod 62 is configured to move along a second longitudinal axis B-B of the tool 10. The threaded rod 62 can move forwards or backwards along the axis B-B depending on the motor driving direction, whereby the bias portion 24 moves with the threaded rod 62.

Figure 7:
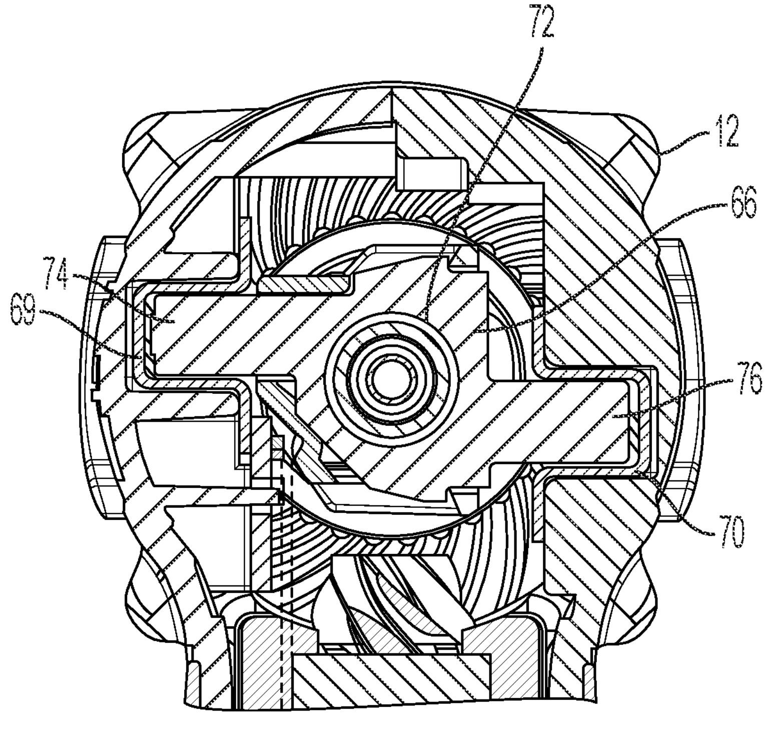
FIG. 7 is a cross-sectional view through the portable electric power tool in FIG. 6 through the axis A-A.

FIG. 7 shows that an anti-rotation bar 66 is engaged with the threaded rod 62 in a manner whereby the anti-rotation bar 66 is axially and rotationally fixed to the threaded rod 62. As the input sleeve 56 is rotated the anti-rotation bar 66 cooperates with the threaded rod 62 and slots 69, 70 within the housing 12 for causing the threaded rod 62 to move axially along the axis B-B. The anti-rotation bar 66 is rotationally fixed with respect to the housing 12 so it slides relative to the housing 12 through the slots 69, 70 during axial movement of the threaded rod 62.

The anti-rotation bar 66 comprises a central hole 72 with a threaded inner surface which is tightly threadably engaged with a reciprocal threaded portion 74 at an end of the threaded rod 62 as shown in FIG. 6.

The anti-rotation bar 66 comprises a first arm 74 and a second arm 76. The first and second arms 74, 76 are mounted in first and second slots 69, 70 within the housing 12. When the threaded rod 62 moves along the second longitudinal axis B-B, the first and second arms 74, 76 slide along the first and second slots 69, 70. The first and second slots 69, 70 extend along longitudinal axes which are parallel to the second longitudinal axis B-B.

With continued reference to FIG. 6 the finger 38 of the moveable bias portion 24 is fixed to the threaded rod 62 by a connector 64, wherein suitable connectors will be apparent to persons skilled in the art.

The threaded rod 62 extends through an opening 65 defined by the housing 12, specifically through an opening 65 defined by the metal part 12*b* of the housing 12. FIG. 6 shows an axial bearing 67 provided inside the housing 12 for supporting the threaded rod 62. The ingress of dirt and moisture through the opening 65 and into the housing 12 is blocked by a flexible bellow 51 provided between the front rim of the opening 65 and the connector 64 (the flexible bellow 51 is omitted from FIGS. 1 to 5 for purposes of illustration). The flexible bellow 51 contracts and expands in length depending on the extent to which the threaded rod 62 is retracted into the tool 10.

The exterior of the section of the metal tool housing part 12*b* defining the opening 65 is threaded and forms a threaded connection with a frame support 61. The frame support 61 is part of the support portion 22 and carries the upper frame portion 26 and the lower frame portion 28, which can be formed integrally with the frame support 61 or be fixed thereto. In view of the foregoing it will be apparent that during tool use, when the threaded rod 62 is caused to move along the second longitudinal axis B-B, the finger 38 and third abutment portion 40 are caused to move within the space defined between the upper and lower frame portions 26, 28. A volume 68 is provided within the housing 12 for accommodating the threaded rod 62 when retracted into the tool 10.

Designers are free to select a suitable way for the controller 44 to control operation of the motor 46 in use to implement a bending operation. In other words designers are free to select a suitable way for the controller 44 to determine when the bend mechanism 20 has been actuated sufficiently for rebar 42 to be bent by a predetermined angle, in other words designers are free to select a suitable way for the controller 44 to determine when the third abutment portion 40 has been moved far enough linearly relative to the first and second abutment portions 30, 32 for rebar 42 to be bent by a predetermined angle.

For example, in a starting configuration of the portable electric rebar bending power tool 10 shown in FIG. 3, the third abutment portion 40 is located in front of the first and second abutment portions 30, 32 so that a user can place a piece of rebar 42 between said features as already described. In this starting configuration the bias portion 24 is located in a home position, which is a predetermined starting position along the second longitudinal axis B-B relative to the support portion 22. Upon the controller 44 determining that the trigger 19 is pulled the controller 44 causes the electric motor 46 to rotate in a forward rotational direction for causing the third abutment portion 40 to be linearly moved along the second longitudinal axis B-B towards the first and second abutment portions 30, 32 whereby the rebar 42 is bent. In some embodiments users are required to manually judge when their rebar is bent enough and thus are required to release the trigger 19 when their rebar 42 has been bent a required amount, wherein upon the controller 44 detecting that the trigger 19 is released it causes the motor 46 to drive in a reverse direction for causing the bias portion 24 to be returned to its home position thereby releasing the bent rebar 42.

As a safety mechanism a mechanical switch may be provided within the power tool 10 for causing a reset operation upon the threaded rod 62 becoming retracted into the tool 10 by a predetermined amount. During a bending stage of operation, the threaded rod 62 is retracted into the tool 10. If the user does not release the trigger 19 eventually an arm 74, 76 of the anti-rotation bar 66 will engage a mechanical switch, whereby upon the controller 44 detecting that the mechanical switch is activated it causes the motor 46 to reverse direction and returns the bias portion 24 to the home position; a user must then release the trigger 19 before a subsequent bending operation can be implemented. In some embodiments instead of a mechanical switch an optical sensor can be used for detecting the presence of the anti-rotation bar 66 or threaded rod 62 for initiating a reset operation. Furthermore, in some embodiments a magnetic sensor is provided for detecting the presence of a magnet carried by the anti-rotation bar 66 for initiating a reset operation.

Alternatively in some embodiments the controller 44 is configured to receive user input via a user interface of the tool 10 which is indicative of the thickness of the rebar 42 and the required bend angle, wherein based on this user input the controller 44 determines the extent to which the bias portion 24 should be retracted upon pulling the trigger 19. During a bending operation, while the trigger 19 remains pulled the controller 44 will cause movement of the bias portion 24 for bending the rebar the required amount and then will reverse motor direction and return the bias portion 24 to the home position, whereby the trigger 19 must be released before a subsequent bending operation can be performed. At any time during a bending operation if the trigger 19 is released the controller 44 will cause reverse movement of the motor 46 and will return the bias portion 24 to the home position.

Moreover, designers are free to select a suitable way for the controller 44 to control operation of the motor 46 to implement a reset operation. In other words, designers are free to select a suitable way for the controller 44 to determine when the bias portion 24 (and thus the third abutment portion 40) has returned to the home position at which point in time reverse movement of the bias portion 24 is ceased. For example, a mechanical switch may be provided within the tool 10. Following a bending operation, upon initiation of reverse movement of the motor 46 for causing a reset operation, the controller 44 is configured to detect output from the mechanical switch indicative that an arm 74, 76 of the anti-rotation bar 66 actuates the mechanical switch, thereby indicating that the bias portion 24 (and thus the third abutment portion 40) has returned to the home position. Alternatively, an optical sensor may be provided within the tool 10 which generates output based on the presence or absence of the anti-rotation bar 66 or threaded rod 62 wherein based on output from the optical sensor the controller 44 can determine that the bias portion 24 (and thus the third abutment portion 40) has reached the home position. In some embodiments a magnetic sensor is provided for detecting the presence of a magnet carried by the anti-rotation bar 66 for generating output indicative that the bias portion 24 (and thus the third abutment portion 40) has reached the home position.

Figure 9:
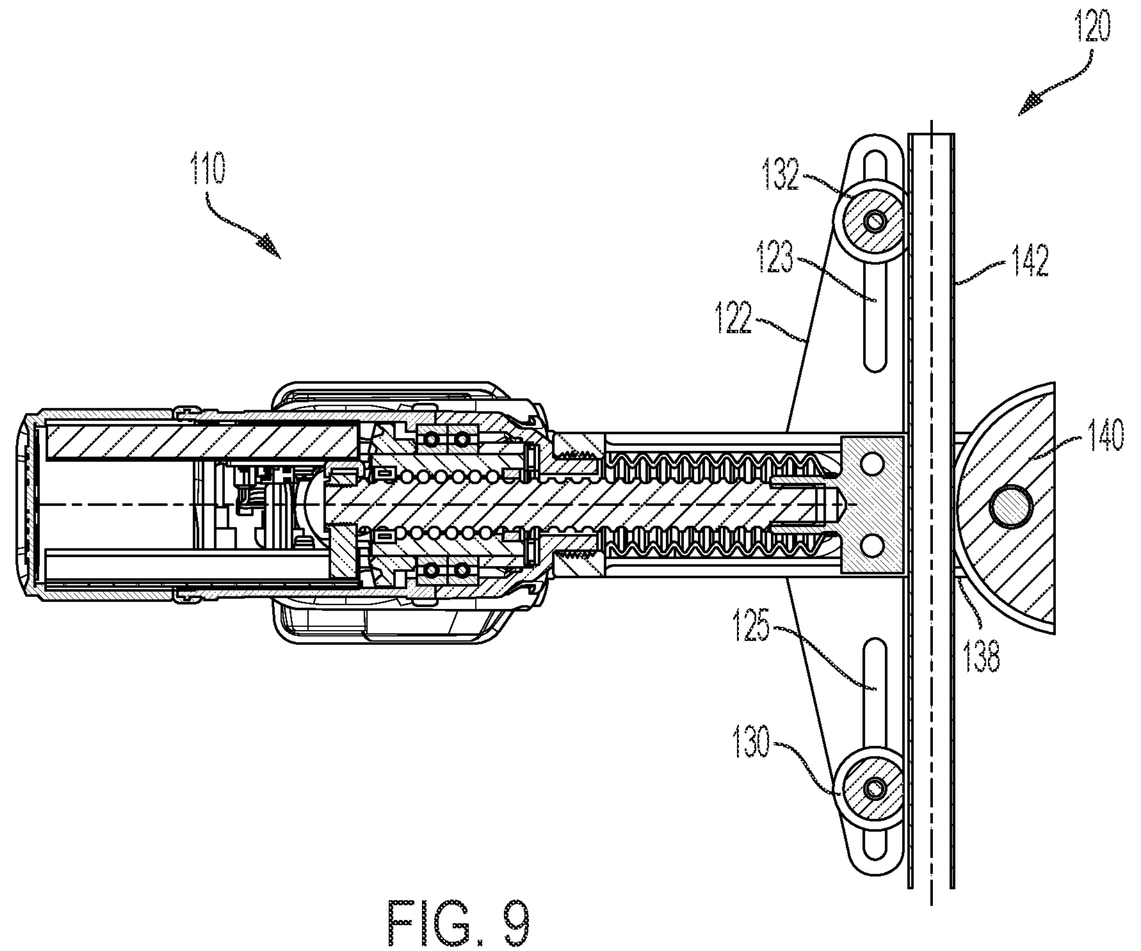
FIGS. 9 and 10 show another embodiment of the portable electric power tool for bending elongate objects at different stages of a bending operation.
Figure 10:
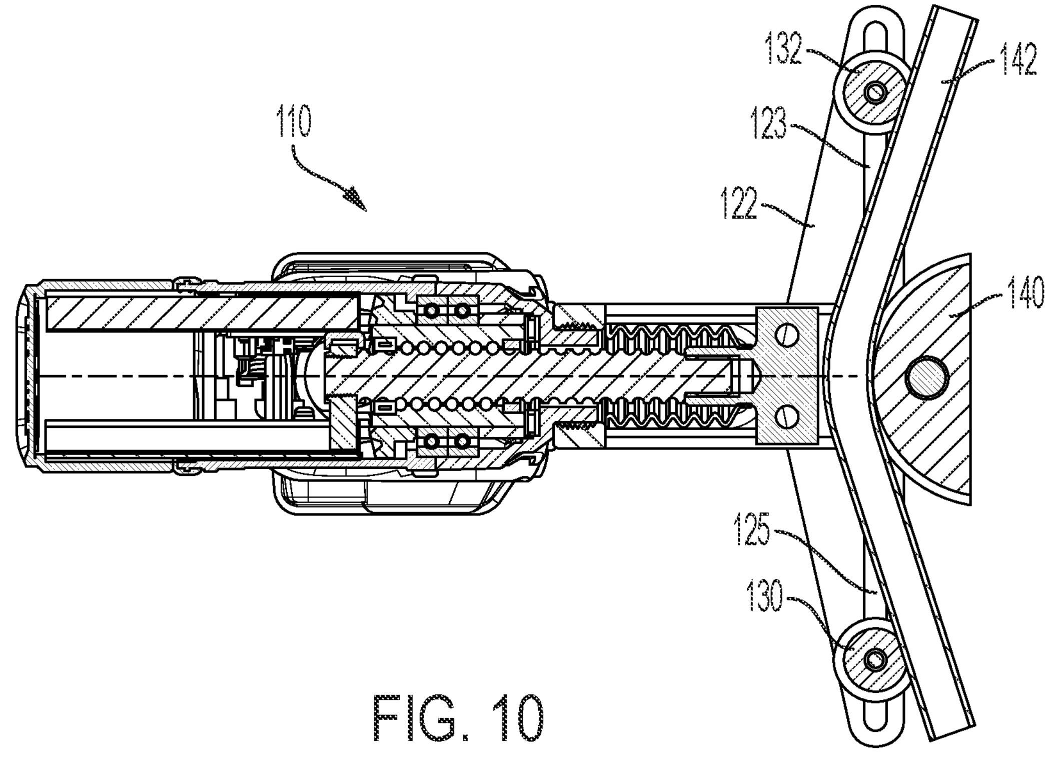

FIGS. 9 and 10 show another embodiment of the portable electric rebar bending power tool 10, wherein corresponding features to the embodiments heretofore described are labelled with like reference numerals increased by 100. The portable electric power tool 110 has a different bend mechanism 120. The distance between the first and second abutment portions 130, 132 of the support portion 122 is capable of being adjusted. The upper frame portion 126 has elongate apertures 123, 125 which align with similar apertures through the lower frame portion 128. The first and second abutment portions 130, 132 can be slidably moved along these apertures and secured in place to define a user selected gap size between the first and second abutment portions 130, 132. The third abutment portion 140 can be removed from the finger 138 of the bias portion and replaced with a third abutment portion having a curvature chosen by the user. By adjusting the distance between the first and second abutment portions 130, 132 and using a third abutment portion 140 having a user selected curvature, a user has greater flexibility to control the extent of bend achieved by a given degree of actuation of the bend mechanism 120.

Figure 11:
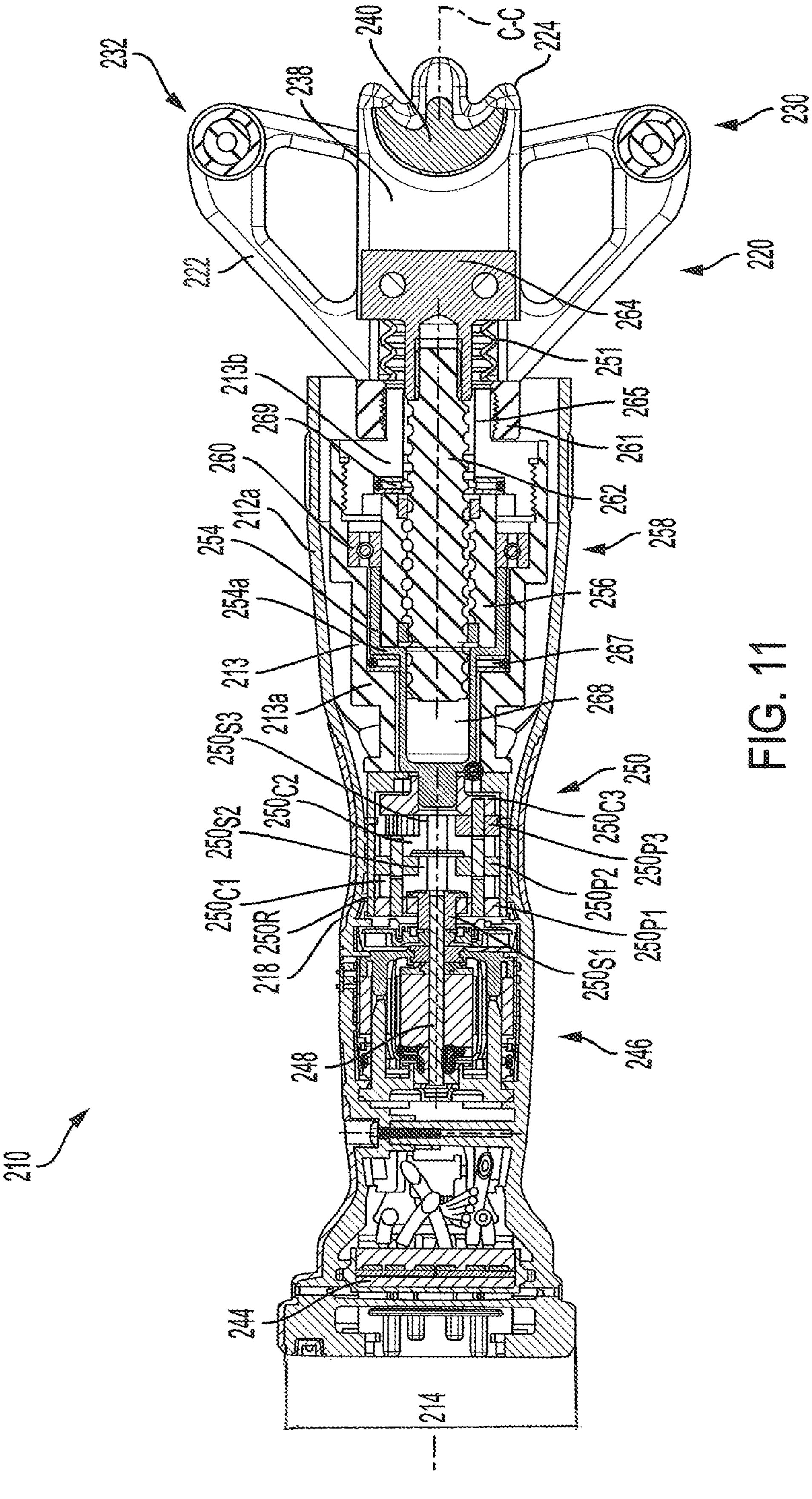
FIGS. 11 and 12 show another embodiment of the portable electric power tool for bending elongate objects at different stages of a bending operation.
Figure 12:
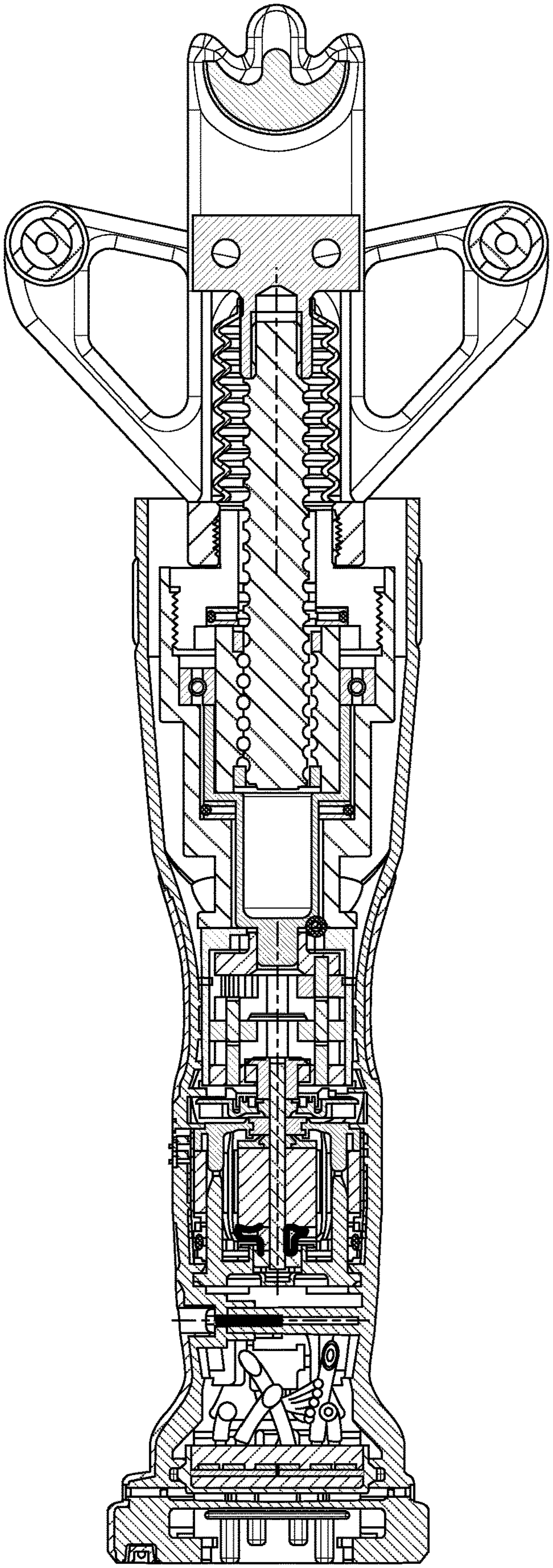

FIGS. 11 and 12 show another embodiment of the portable electric rebar bending power tool 210, wherein corresponding features to the first embodiment described herein are labelled with like reference numerals increased by 200. The portable electric power tool 210 is an inline version wherein the battery attachment feature (and thus battery 214), the electric motor 246, the transmission 250, the ball screw mechanism 258 and the bend mechanism 220 are arranged in axial sequence one after the other.

Looking at FIG. 11 the motor output shaft 248 extends along the axis C-C and drives an input sun gear $\mathbf{250}_{S1}$ of the first stage of the transmission 250. The input sun gear $\mathbf{250}_{S1}$ meshes with a plurality of first stage planet gears $\mathbf{250}_{P1}$ which mesh with a stationary outer ring gear $\mathbf{250}_{R}$ (which extends along the axis C-C) and are coupled to a first stage carrier $\mathbf{250}_{C1}$. An axial extension of the first stage carrier $\mathbf{250}_{C1}$ is the input sun gear $\mathbf{250}_{S2}$ of the second stage of the transmission 250. The input sun gear $\mathbf{250}_{S2}$ meshes with a plurality of second stage planet gears $\mathbf{250}_{P2}$ which mesh with the stationary outer ring gear $\mathbf{250}_{R}$ and are coupled to a second stage carrier $\mathbf{250}_{C2}$. An axial extension of the second stage carrier $\mathbf{250}_{C2}$ is the input sun gear $\mathbf{250}_{S3}$ of the third stage of the transmission 250. The input sun gear $\mathbf{250}_{S3}$ meshes with a plurality of third stage planet gears $\mathbf{250}_{P3}$ which mesh with the stationary outer ring gear $\mathbf{250}_{R}$ and are coupled to a third stage carrier $\mathbf{250}_{C3}$. An axial extension of the third stage carrier $\mathbf{250}_{C3}$ cooperates with a drive sleeve 254 of the ball screw mechanism 258, wherein such features are rotationally locked such that rotation of the third stage carrier $\mathbf{250}_{C3}$ rotatably drives the drive sleeve 254.

It will be appreciated that there is some design freedom in the transmission 250 between the motor output shaft 248 and the drive sleeve 254 of the ball screw mechanism 258. In particular the number of planetary gear stages, and its (or their) configuration, forming the transmission 250 depends on the required gear ratio to be achieved between the motor output shaft 248 and the drive sleeve 254 of the ball screw mechanism.

Similarly, as heretofore described in connection with the first embodiment the driving sleeve 254 is fixed to an input sleeve 256 due to a friction fit arrangement and an internal surface of the input sleeve 256 comprises a threaded surface for cooperating with a threaded surface of the threaded rod 262. Moreover, a plurality of balls, such as metal ball bearings, ride in the opposing threaded surfaces of the input sleeve 256 and threaded rod 262, thereby defining a ball screw arrangement 258.

A metal inner housing 213 supports the ball screw arrangement 258. A first axial bearing 267 is received between the internal surface of a first step portion 213*a* of the metal inner housing 213 and an external surface of a step portion 254*a* of the drive sleeve 254. A second axial bearing 269 is received between the internal surface of a second step portion 213*b* of the metal inner housing 213 and an end surface of the input sleeve 256. The input sleeve 256 is thus axially supported between the second axial bearing 269 and an inner surface of the drive sleeve 254. Additionally, the input sleeve 256 is supported in a radial direction by one or more bearings 260 which permit rotation of the input sleeve 256. In a radial direction the (or each) bearing 260 is (or are) located between the input sleeve 256 and the inner surface of the metal inner housing 213, whereby an outer race of the (or each) bearing 260 is friction fit with an inner surface of the metal inner housing 213 and an inner race of the (or each) bearing 260 is friction fit with the input sleeve 256. Looking at FIG. 11 the input sleeve 254 is axially supported between the axial bearing 267 and the bearing 260, wherein the input sleeve 254 extends through an opening defined by the axial bearing 267. The input sleeve 254 rotates in use without touching the inner surface of the metal inner housing 213.

In use, torque from the electric motor 246 is transferred through the transmission 250 to the input sleeve 254, whereby rotation thereof drives rotation of the driving sleeve 246 for causing axial movement of the threaded rod 262. The threaded rod 262 is configured to move along the longitudinal axis C-C of the tool 210. The threaded rod 262 can move forwards or backwards along the axis C-C depending on the motor driving direction, whereby the bias portion 224 moves with the threaded rod 262 causing actuation of the bend mechanism 220.

With continued reference to FIG. 11 the finger 238 of the moveable bias portion 224 is fixed to the threaded rod 262 by a connector 264, wherein suitable connectors will be apparent to persons skilled in the art. In particular the threaded rod 262 is rotatably and axially fixed to the connector 264 and thereby to the finger. Since the bias portion 224 and support portion 222 of the bend mechanism 220 must permit movement relative to each other they are shaped and cooperate to enable axial movement between the bias portion 224 and support portion 222 but restrict rotational movement of the bias portion 224 and support portion 222 relative to each other; whereby in use the threaded rod 262 is able to move axially within the tool 210 but is restricted from rotating.

The threaded rod 262 extends through an opening 265 defined by the inner metal housing 213. An exterior section of the metal inner housing 213 forms a threaded connection with the frame support 261. The frame support 261 is part of the support portion 222 and carries the upper frame portion and the lower frame portion, which can be formed integrally with the frame support 261 or be fixed thereto. A volume 268 is provided for accommodating the threaded rod 262 when retracted into the tool 210. The ingress of dirt and moisture through the opening 265 and into the metal inner housing 213 is blocked by a flexible bellow 251 provided between the front rim of the opening 265 and the connector 264. The flexible bellow 251 contracts and expands in length depending on the extent to which the threaded rod 262 is retracted into the tool 210. Comparing FIGS. 11 and 12, these drawings illustrate the same tool 210 however differ by the axial position of the threaded rod 262 and thereby the consequential configuration of the bend mechanism 220.

Designers are free to select a suitable way for the controller 244 to control operation of the motor 246 in use to implement a bending operation. In other words designers are free to select a suitable way for the controller 244 to determine when the bend mechanism 220 has been actuated sufficiently for rebar to be bent by a predetermined angle, in other words designers are free to select a suitable way for the controller 244 to determine when the third abutment portion 240 has been moved far enough linearly relative to the first and second abutment portions 230, 232 for rebar to be bent by a predetermined angle.

For example, in a starting configuration of the portable electric rebar bending power tool 210 shown in FIG. 11, the third abutment portion 240 is located in front of the first and second abutment portions 230, 232 so that a user can place a piece of rebar between said features as already described. In this starting configuration the bias portion 224 is located in a home position, which is a predetermined starting position along the longitudinal axis C-C relative to the support portion 222. Upon the controller 244 determining that a trigger of the tool 210 is actuated the controller 244 causes the electric motor 246 to rotate in a forward rotational direction for causing the third abutment portion 240 to be linearly moved along the longitudinal axis C-C towards the first and second abutment portions 230, 232 whereby the rebar is bent. In some embodiments users are required to manually judge when their rebar is bent enough and thus are required to release the trigger when their rebar has been bent a required amount, wherein upon the controller 244 detecting that the trigger is released it causes the motor 246 to drive in a reverse direction for causing the bias portion 224 to be returned to its home position thereby releasing the bent rebar.

As a safety mechanism a mechanical switch may be provided within the power tool 210 for causing a reset operation upon the threaded rod 262 becoming retracted into the tool 210 by a predetermined amount. During a bending stage of operation, the threaded rod 262 is retracted into the tool 210. If the user does not release the trigger eventually the threaded rod 262 (or a feature provided thereon) will engage a mechanical switch, whereby upon the controller 244 detecting that the mechanical switch is activated it causes the motor 246 to reverse direction and returns the bias portion 224 to the home position; a user must then release the trigger before a subsequent bending operation can be implemented. In some embodiments instead of a mechanical switch an optical sensor can be used for detecting the presence of the threaded rod 262 for initiating a reset operation. Furthermore, in some embodiments a magnetic sensor is provided for detecting the presence of a magnet carried by the threaded rod 262 for initiating a reset operation.

Alternatively in some embodiments the controller 244 is configured to receive user input via a user interface of the tool 210 which is indicative of the thickness of the rebar and the required bend angle, wherein based on this user input the controller 244 determines the extent to which the bias portion 224 should be retracted upon actuating the trigger. During a bending operation, while the trigger remains actuated the controller 244 will cause movement of the bias portion 224 for bending the rebar the required amount and then will reverse motor direction and return the bias portion 224 to the home position, whereby the trigger must be released before a subsequent bending operation can be performed. At any time during a bending operation if the trigger is released the controller 244 will cause reverse movement of the motor 246 and will return the bias portion 224 to the home position.

Moreover, designers are free to select a suitable way for the controller 244 to control operation of the motor 246 to implement a reset operation. In other words, designers are free to select a suitable way for the controller 244 to determine when the bias portion 224 (and thus the third abutment portion 240) has returned to the home position at which point in time reverse movement of the bias portion 224 is ceased. For example, a mechanical switch may be provided within the tool 210. Following a bending operation, upon initiation of reverse movement of the motor 246 for causing a reset operation, the controller 244 is configured to detect output from the mechanical switch indicative that threaded rod 262 (or a feature provided thereon) actuates the mechanical switch, thereby indicating that the bias portion 224 (and thus the third abutment portion 240) has returned to the home position. Alternatively, an optical sensor may be provided within the tool 210 which generates output based on the presence or absence of the threaded rod 262 wherein based on output from the optical sensor the controller 244 can determine that the bias portion 224 (and thus the third abutment portion 240) has reached the home position. In some embodiments a magnetic sensor is provided for detecting the presence of a magnet carried by the threaded rod 262 for generating output indicative that the bias portion 224 (and thus the third abutment portion 240) has reached the home position.

It will be appreciated that whilst various aspects and embodiments have heretofore been described the scope of the present invention is not limited thereto and instead extends to encompass all arrangements, and modifications and alterations thereto, which fall within the spirit and scope of the appended claims.

In some embodiments the depressions 30*a*, 32*a*, 40*a* are omitted.

In some embodiments the support portion 22 has a different configuration. The drawings show the first and second abutment portions 30, 32 to be fingers coupled to, and extending between, the upper frame portion 26 and lower frame portion 28. In some embodiments the support portion 22 is formed as a single piece, wherein the first and second abutment portions 30, 32 are formed by the edges of walls extending between the upper frame portion 26 and lower frame portion 28, wherein the walls are integrally formed with the upper frame portion 26 and lower frame portion 28.

In some embodiments the angle between the first longitudinal axis A-A and the second longitudinal axis B-B may not be 90 degrees and instead may range between 45 degrees to 145 degrees, which is achievable by adjusting the angle at which the input pinion 52 and the bevel gear 53 of the bevel gear arrangement 49 mesh.

In some embodiments the motor 46 is only partially received within the handle 18.

In some embodiments at least one planetary gear stage of the transmission 50 is received in the handle 18.

In some embodiments the motor 46 and the transmission 50 are received in the handle 18.

It has already been mentioned that by providing the motor 40 within the handle 18 leaves more space available within the tool housing 12 above the handle 18, whereby there is more freedom to position features of the tool 10 in positions which improve weight distribution of internal features of the tool 10. By providing the motor 46 only partially within the handle 18 achieves such advantage to a lesser extent. By providing the motor 46 and also at least part of the transmission 50 within the handle 18 achieves such advantage to a greater extent. By providing the motor 46 and also the transmission 50 within the handle 18 achieves such advantage to a fuller extent.

In some examples the battery 14, 214 is removable from the tool 10, 110, 210 or alternatively the battery 14, 214 is integral to the tool 10, 110, 210. Alternatively, or additionally the tool 10, 110, 210 may be configured to receive electric power from a mains power supply.

As shown in FIGS. 6 and 11, the driving sleeve 54, 254 and input sleeve 56, 256 are fixed to each other due to a friction fit arrangement. Alternatively, the driving sleeve 54, 254 and input sleeve 56, 256 can be fixed via an interlocking arrangement such as a spline fit arrangement or other male and female interlocking-type arrangement.

The electric motor 46, 246 has been described as being a brushless motor and the controller 44, 244 cooperates with the brushless motor (in particular with its control electronics) in order to control the brushless motor. In other embodiments however the motor 46, 246 may be a brushed motor having a motor output shaft driven by a stator and having at least one magnet on the motor output shaft. It is here mentioned that in battery operated embodiments the motor 46, 246 is configured to operate using DC current, whereas in mains operated embodiments the motor is configured to operate using AC current.

In some embodiments the tool 10, 110, 210 may have a roller screw mechanism (sometimes known as a planetary roller screw mechanism) instead of a ball screw mechanism 58, 258 for converting torque into linear force. A person skilled in the art will appreciate that this can be achieved by rotationally fixing the driving sleeve 54, 254 to an input sleeve of the roller screw mechanism; wherein a set of rollers (sometimes called planetary rollers) are provided between the internal surface of the input sleeve and an external surface of the threaded rod 62, 262. When the driving sleeve 54, 254 is caused to rotate it drives rotation of the input sleeve of the roller screw mechanism and thus via the rollers causes linear movement of the threaded rod 62, 262 and thus causes actuation of the bend mechanism 20, 120, 220.

Various suitable types of connector 64, 264 will be apparent to persons skilled in the art. For example, the connector 64, 264 has a first attachment portion for attaching to the finger 38, 238 and also a second attachment portion for attaching to the threaded rod 62, 262. The first attachment portion may be a plug and socket-type attachment arrangement for mating with an appropriately shaped part of the finger 38, 238, or a threaded attachment arrangement for threadably engaging with part of the finger 38, 238 or alternatively the first attachment portion may be attached to the finger 38, 238 via adhesive or welding. Similarly, the second attachment portion may be a plug and socket-type attachment arrangement for mating with an appropriately shaped part of the threaded rod 62, 262, or a threaded attachment arrangement for threadably engaging with the threaded rod 62, 262 or alternatively the second attachment portion may be attached to the threaded rod via adhesive or welding.

In some embodiments the connector 64, 264 is omitted and instead the threaded rod 62, 262 is fixed directly to the finger 38, 238 of the bias portion 24, 224 such as via a plug and socket-type attachment whereby one of the threaded rod 62, 262 and finger 38, 238 plugs into the other, or via a threaded attachment arrangement whereby one of the threaded rod 62, 262 and finger 38, 238 is threadably received by the other, or via an adhesive arrangement whereby the threaded rod 62, 262 is bonded to the finger 38, 238; in some embodiments the threaded rod 62, 262 and finger 38, 238 are welded together.

In some embodiments the frame support 61 is fixed relative to the housing 12 in a manner different to threadably engaging the frame support 61 to the metal part 12*b* of the housing 12 as heretofore described. In some embodiments the frame support 61 may be fixed to the metal part 12*b* of the housing 12 via adhesive, welding, or one or more bolts or screws. Alternatively in some embodiments one or more bolts extend between the frame support 61 and an internal frame (backbone) of the tool 10 located within the housing 12 for fixing the frame support 61 to the frame and thus relative to the housing 12.

In the foregoing the bias portion 24, 224 has been described as being driven relative to the stationary support portion 22, 222 for implementing a bending operation. In other embodiments such relative motion, and thus bending operation, can be achieved by alternatively configuring the tool 10, 110, 210 so that the support portion 22, 222 is driven relative to a stationary bias portion 24, 224.

Figure 8:
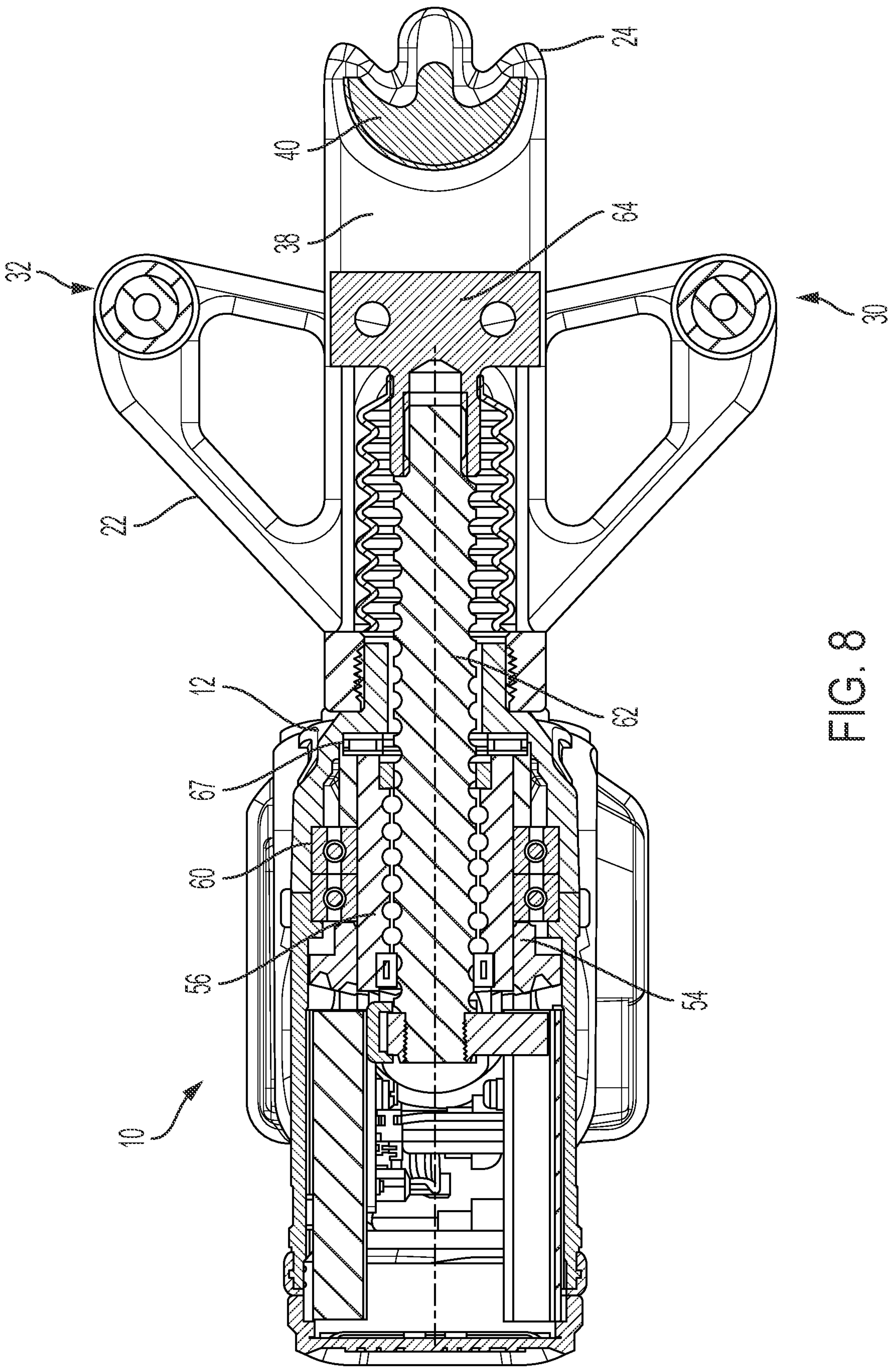
FIG. 8 is a cross-sectional view through the portable electric power tool in FIG. 6 through the axis B-B.

It will be appreciated that movement of the bias portion 24, 224 and support portion 22, 222 relative to each other is what enables a bending operation to occur, wherein based on the disclosure herein persons skilled in the art will envisage variations of the tool 10, 110, 210 in which either a pulling or pushing of one of the bias portion 24, 224 and support portion 22, 222 relative to the other of the bias portion 24, 224 and support portion 22, 222 implements a bending operation The embodiment of the tool 10 described in connection with FIGS. 6 to 8 has an anti-rotation bar 66 for preventing rotation of the threaded rod 62. On the contrary the embodiment of the tool 210 described in connection with FIGS. 11 and 12 omits an anti-rotation bar whereas rotation of the threaded rod 62 is prevented by configuring the bias portion 224 and support portion 222 of the bend mechanism 220 so as to permit movement relative axial movement between the bias portion 224 and support portion 222 but restrict rotational movement of the bias portion 224 and support portion 222 relative to each other; whereby in use the threaded rod 262 is able to move axially within the tool 210 but is restricted from rotating. It will be appreciated that in some embodiments the tool 10 can omit an anti-rotation bar 66 whereas rotation of the threaded rod 62 is prevented by cooperation between the bias portion 24 and support portion 22 of the bend mechanism 20 which permit relative axial movement but not relative rotational movement; wherein operation of the tool 10 can be controlled in a manner similar to that heretofore described in connection with the tool 210. Furthermore, it will be appreciated that in some embodiments the tool 210 can have an anti-rotation bar for preventing rotation of the threaded rod 262; wherein operation of the tool 210 can be controlled in a manner similar to that heretofore described in connection with the tool 10.

A bend mechanism can be a bender. A conversion mechanism can be a convertor. A ball screw mechanism can be a ball screw. A roller screw mechanism can be a roller screw.

Finally the heretofore described functionality need not necessarily be used exclusively in rebar bending tools but may be used in other contexts, namely portable electric power tools for bending elongate objects more generally such as metal conduits e.g. pipes or tubes.

What is claimed is:

1. A portable electric power tool for bending elongate objects comprising:

a housing having a handle portion extending along a first axis;

an electric motor and a transmission at least partially arranged within the handle portion, the electric motor having a motor output shaft extending along the first axis, a rod extending from a first rod end disposed within the housing to a second rod end disposed outside the housing;

the transmission operably coupled to the rod adjacent the first rod end for converting torque into a linear force to linearly translate the rod within and relative to the housing; and a bend mechanism having a support portion fixed relative to the housing and a bias portion operatively coupled to the second rod end to effectuate linear movement of the bias portion relative to the support portion in response to the linear translation of the rod for causing force to be applied by the bend mechanism to an elongate object in use at different locations along the length of the elongate object for bending the elongate object.

2. The portable electric power tool of claim 1, wherein the rod extends linearly along a second axis; and the transmission includes a bevel gear arrangement for redirecting torque flowing along the first axis and input to the bevel gear arrangement in use so that torque output from the bevel gear arrangement flows along the second axis.

3. The portable electric power tool of claim 2, wherein the angle between the first axis and the second axis is between 45 degrees to 145 degrees.

4. The portable electric power tool of claim 3, wherein the angle between the first axis and the second axis is approximately 90 degrees.

5. The portable electric power tool of claim 1, wherein the electric motor is located entirely within the handle of the tool.

6. The portable electric power tool of claim 2, wherein the transmission comprises at least one planetary gear stage for transferring torque from the electric motor along the first axis in use.

7. The portable electric power tool of claim 6, wherein the at least one planetary gear stage is at least partially located within the handle.

8. The portable electric power tool of claim 7, wherein the at least one planetary gear stage is entirely located within the handle of the tool.

9. The portable electric power tool of claim 2, further comprising a battery releasably connected to a base of the handle portion so that a notional line extending between the battery and the motor output shaft extends along the first axis.

10. The portable electric power tool of claim 1, wherein the rod extends linearly along the first axis such that the electric motor, the transmission and the bend mechanism are arranged along the first axis in axial sequence one after the other.

11. The portable electric power tool of claim 10, further comprising a battery releasably located on the same said first axis.

12. The portable electric power tool of claim 1, wherein the support portion defines first and second abutment portions separated by a space between them through which a third abutment portion, defined by the bias portion is moved in use and wherein upon locating the elongate object between the support portion and the bias portion and causing linear movement of the bias portion relative to the support portion in use the first, second and third abutment portions are each caused to exert a force on the elongate object for bending the elongate object.

13. The portable electric power tool of claim 12, wherein the distance between the first and second abutment portions is adjustable.

14. The portable electric power tool of claim 1, wherein the tool is configured such that linear movement of the bias portion in a first direction relative to the support portion causes bending of the elongate object in use or the tool is configured such that linear movement of the bias portion in a second direction, opposite to the first direction, relative to the support portion causes bending of the elongate object in use.

15. The portable electric power tool of claim 1, wherein the electric motor is a brushless DC motor.

16. The portable electric power tool of claim 1, wherein the power tool is a rebar bending tool.

17. The portable electric power tool of claim 1, wherein the power tool is a linear conduit bending tool.

18. The portable electric power tool of claim 1, wherein the power tool is a pipe or tube bending tool.

19. The portable electric power tool of claim 1, wherein the bias portion is operably connected to the second rod end by a connector, and a flexible bellow extends from the connector to the housing in surrounding relationship with a portion of the rod.

* * * * *